United States Patent
Vanni et al.

(10) Patent No.: US 9,756,978 B2
(45) Date of Patent: Sep. 12, 2017

(54) ADAPTIVE FLOW CONTROL DEVICE FOR A FLOW OF A LIQUID, IN PARTICULAR FOR USE IN A COFFEE-MAKING MACHINE

(75) Inventors: Alfredo Vanni, Magliolo (IT); Luca Bugnano, Turin (IT); Alberto Cabilli, Moncalieri (IT); Giovanni Jacazio, Pino Torinese (IT); Laura Gastaldi, Turin (IT); Massimo Sorli, San Mauro Torinese (IT)

(73) Assignee: LUIGI LAVAZZA S.P.A., Turin (IT)

( * ) Notice: Subject to any disclaimer, the term of this patent is extended or adjusted under 35 U.S.C. 154(b) by 397 days.

(21) Appl. No.: 14/112,493

(22) PCT Filed: Apr. 19, 2012

(86) PCT No.: PCT/IB2012/051972
§ 371 (c)(1),
(2), (4) Date: Oct. 17, 2013

(87) PCT Pub. No.: WO2012/143884
PCT Pub. Date: Oct. 26, 2012

(65) Prior Publication Data
US 2014/0041528 A1    Feb. 13, 2014

(30) Foreign Application Priority Data
Apr. 20, 2011 (IT) .............................. TO2011A0349

(51) Int. Cl.
| | |
|---|---|
| *A47J 31/10* | (2006.01) |
| *A47J 31/00* | (2006.01) |
| *A47J 31/46* | (2006.01) |
| *F16K 3/08* | (2006.01) |
| *F16K 31/53* | (2006.01) |
| *G05D 7/01* | (2006.01) |

(52) U.S. Cl.
CPC ............... *A47J 31/46* (2013.01); *F16K 3/085* (2013.01); *F16K 31/535* (2013.01); *G05D 7/0126* (2013.01); *Y10T 137/7761* (2015.04)

(58) Field of Classification Search
CPC .. A47J 31/00; A47J 31/10; A47J 31/56; A47J 31/58; A47J 31/60; A47J 31/4457
USPC ..................................................... 99/279–323
See application file for complete search history.

(56) References Cited

U.S. PATENT DOCUMENTS

| | | | | |
|---|---|---|---|---|
| 5,538,749 | A * | 7/1996 | Shimp ....................... | A23L 1/40 426/578 |
| 5,855,162 | A * | 1/1999 | Bauer ...................... | A47J 31/46 222/566 |
| 2001/0022138 | A1 | 9/2001 | Schmed | |
| 2005/0077403 | A1 * | 4/2005 | Yang ....................... | A47J 42/46 241/100 |

(Continued)

FOREIGN PATENT DOCUMENTS

| | | | |
|---|---|---|---|
| AU | 24994/77 | * | 5/1977 |
| EP | 1 016 364 A2 | | 7/2000 |

(Continued)

Primary Examiner — Michael Laflame, Jr.
(74) Attorney, Agent, or Firm — Sughrue Mion, PLLC

(57) ABSTRACT

A machine for preparing coffee, including a brewing chamber; a water supply for supplying a flow of water to the brewing chamber; and an adaptive flow control device for the flow of water, positioned in series with the water supply and the brewing chamber.

7 Claims, 5 Drawing Sheets

(56) References Cited

U.S. PATENT DOCUMENTS

| | | | | |
|---|---|---|---|---|
| 2006/0291964 A1* | 12/2006 | Wang | ................ | H01H 35/2614 |
| | | | | 406/12 |
| 2009/0258114 A1* | 10/2009 | Lassota | .................. | A47J 31/56 |
| | | | | 426/78 |
| 2010/0031826 A1* | 2/2010 | Doglioni Majer | .... | A47J 31/465 |
| | | | | 99/279 |
| 2010/0178184 A1* | 7/2010 | Simmons | ................ | F04B 9/135 |
| | | | | 417/472 |

FOREIGN PATENT DOCUMENTS

| EP | 1 133 944 A2 | 9/2001 |
|---|---|---|
| FR | 2 353 093 A1 | 12/1977 |
| WO | 2009/040856 A2 | 4/2009 |

* cited by examiner

ADAPTIVE FLOW CONTROL DEVICE FOR A FLOW OF A LIQUID, IN PARTICULAR FOR USE IN A COFFEE-MAKING MACHINE

CROSS REFERENCE TO RELATED APPLICATIONS

This is a National Stage of International Application No. PCT/IB2012/051972, filed Apr. 19, 2012, claiming priority from Italian Patent Application No. TO2011A000349, filed Apr. 20, 2011, the contents of all of which are incorporated herein by reference in their entirety.

The present invention relates to an adaptive flow control device for a flow of a liquid, in particular for use in a coffee-making machine.

More specifically, the invention relates to a flow control device of the type comprising:

a body having an inlet passage and an outlet passage for the liquid, and wherein there is defined an internal cavity which by means of a movable intermediate member is divided into a first and second chamber which are sealingly separated from one another, the first chamber being adapted to be put into communication with the inlet passage, and resilient means being provided in the second chamber and tending to urge said movable member towards the first chamber, said movable member being connected to valve member interacting with an associated valve seat provided in said body so as to form a valve device defining a first orifice with a variable passage cross section between the inlet passage and the outlet passage; and an adjustable throttle device adapted to define a further orifice with a variable passage cross section, substantially in series with said first orifice, between the inlet passage and the outlet passage.

A flow control device of this type is disclosed in European patent application EP-A-1 133 944. This document (see FIG. 4 in particular) describes and illustrates an adaptive flow controller of the type specified above, wherein the valve device is positioned in the first chamber, to which the inlet passage is connected. The second chamber, which houses the spring acting on the movable body and therefore on the movable valve member, is not affected by the passage of the liquid. Additionally, the adjustable throttle device is positioned downstream of the valve device.

In this prior art flow control device, the pressure which is established in the portion located between the two orifices, and which consequently determines the flow rate of liquid through the device, is not independent of the inlet pressure.

One object of the present invention is to provide an improved flow control device adapted to provide a flow control action which is independent of the inlet pressure.

This and other objects are achieved according to the invention with an adaptive flow control device of the type described above, characterized in that the aforesaid valve device is positioned in the second chamber, and the inlet passage is also connected to this second chamber, and in that the adjustable throttle device is positioned between the inlet passage and said second chamber, upstream of the valve device.

Further characteristics and advantages of the present invention will be made clear by the following detailed description, provided purely by way of non-limiting example with reference to the attached drawings, in which.

Figure 1:
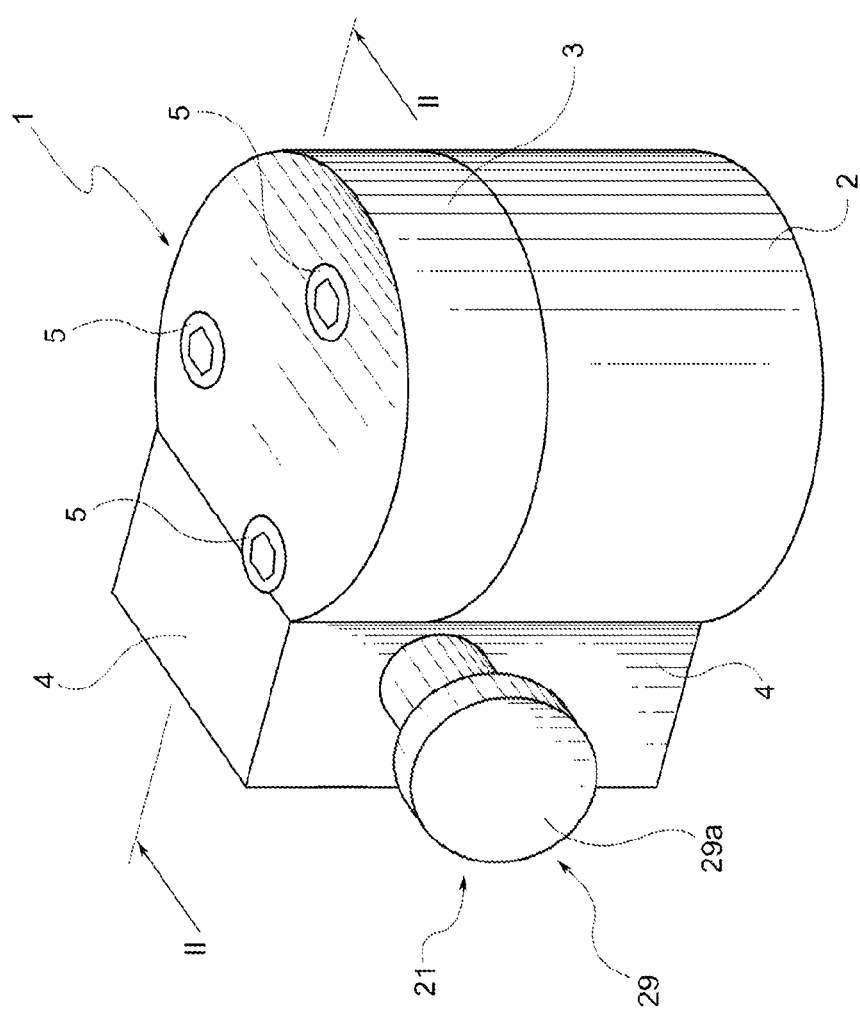
FIG. 1 is a perspective view of a flow control device according to the invention.

In the drawings, the number 1 indicates the whole of a flow control device according to the invention.

In the embodiment which is illustrated by way of example, the adaptive flow control device 1 comprises a body formed by three principal parts or bodies, indicated (in FIGS. 1 to 3) by 2, 3 and 4, respectively.

The bodies 2 and 3 are combined to form a body in the form of a cylinder cut along a chord plane parallel to the axis (see FIG. 1 in particular).

The body 4 is essentially of parallelepipedal shape, and is placed adjacent to the flat lateral surface of the assembly formed by the bodies 2 and 3.

The bodies 2 and 3 are held together by screws indicated by 5 in FIG. 1.

Figure 3:
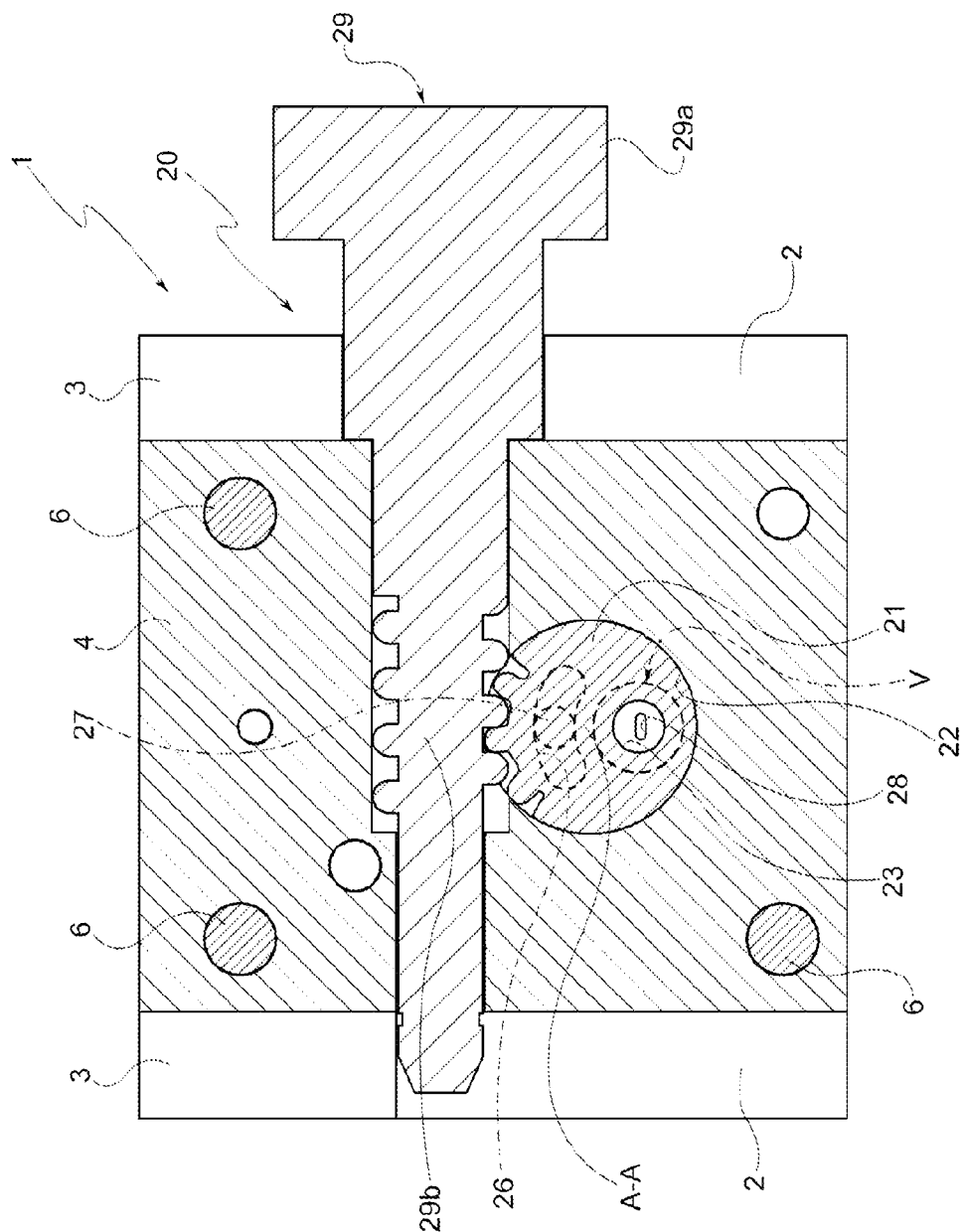
FIG. 3 is a sectional view taken along the line III-III of FIG. 2.
Figure 4:
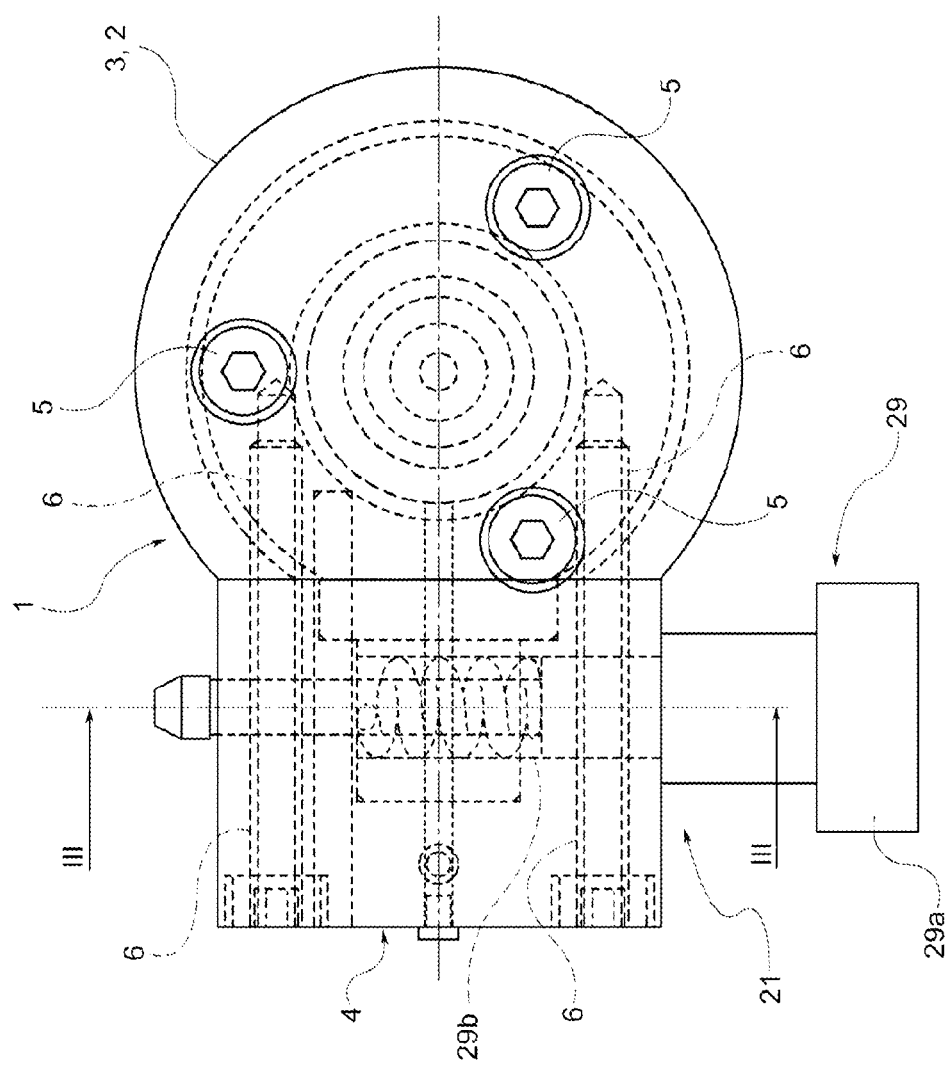
FIG. 4 is a plan view from above of the flow control device according to the preceding figures.

The body 4 is fastened to the assembly of bodies 2 and 3 by means of screws indicated by 6 in FIGS. 3 and 4.

Figure 2:
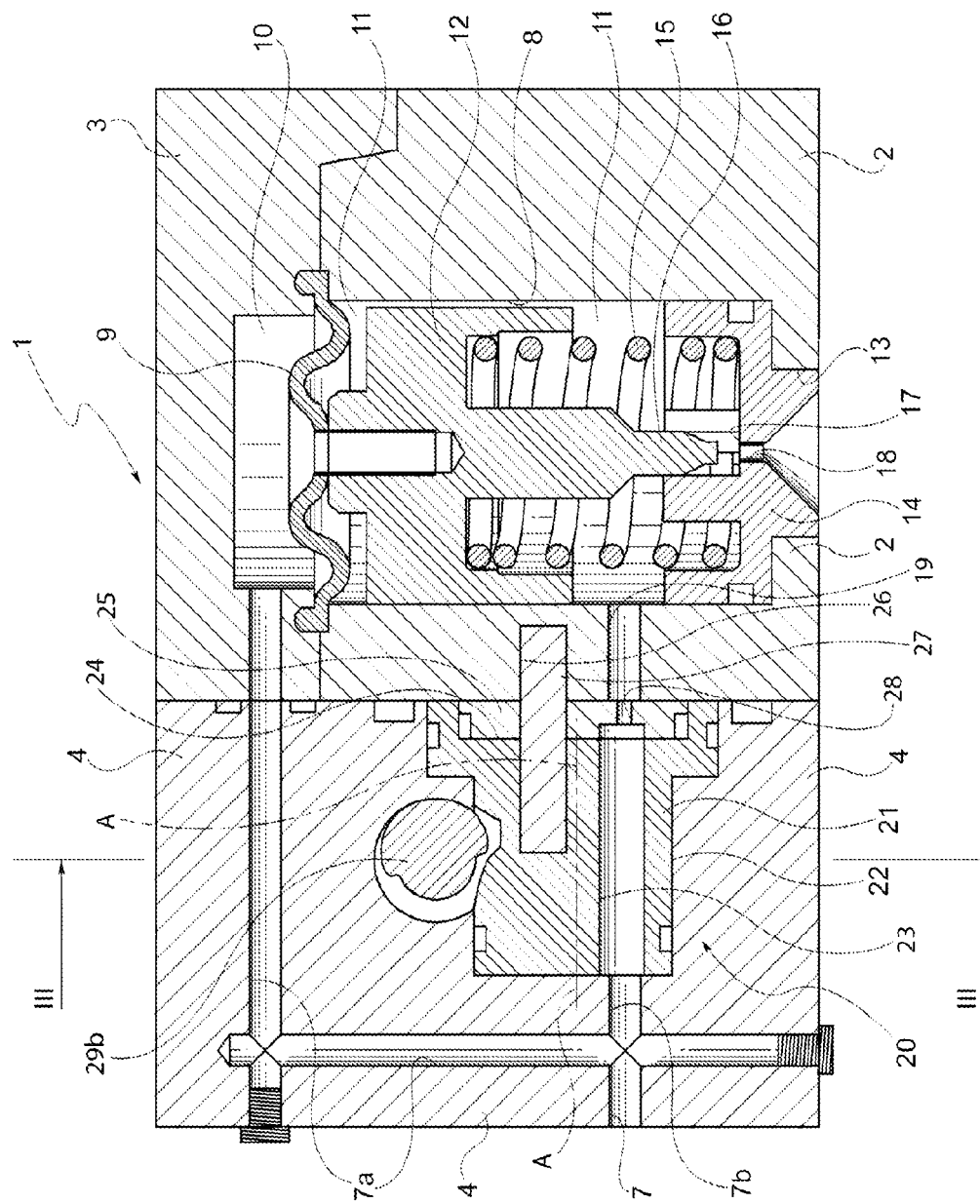
FIG. 2 is a sectional view taken along the line II-II of FIG. 1.

With reference to FIG. 2, an inlet passage 7, bifurcated into two branches 7a and 7b, is formed in the body 4.

The branch 7a of the inlet passage initially rises upwards, and then continues horizontally towards the body 3.

An essentially cylindrical cavity, indicated as a whole by 8 in FIG. 2, is defined in the assembly formed by the bodies 2 and 3.

A resilient diaphragm 9, made of elastomeric material for example, has its periphery gripped between the bodies 2 and 3, and divides the cavity 8 into a first chamber 10 and a second chamber 11 which are separated sealingly from each other.

The central portion of the membrane 9 is fixed to a piston 12 mounted slidably (not sealingly) in the chamber 11.

The chamber 11, which in the illustrated embodiment is completely defined within the lower body 2, has an aperture 13 in its lower part.

A shaped member 14, facing the piston 12, is positioned in the lower part of the chamber 11, near the aperture 13.

The number 15 indicates a helical spring positioned in the chamber 11 between the member 14 and the piston 12. This spring 15 tends to bias the piston 12 towards the first chamber 10.

The piston 12 has a tapered central extension 16 in its lower part, this extension being adapted to act as a valve member by interacting with a seat 17 formed centrally in the shaped member 14, around an axial passage 18 which opens outside the body 2 and which forms the outlet passage of the flow control device 1 as a whole.

Again with reference to FIG. 2, the first, or upper, chamber 10 is in permanent communication with the inlet passage 7 through the branch 7a of the latter, which extends in the body 4 and continues into the body 3 as far as said chamber 10.

The second, or lower, chamber 11 is also in communication with the inlet passage 7, through an adjustable throttle device indicated as a whole by 20 in FIG. 2, interposed between the branch 7b of the inlet passage 7 and a corresponding passage 19 formed in the body 2.

In the illustrated embodiment, the throttle device 20 comprises (see FIG. 2) an essentially cylindrical body 21 mounted rotatably in the body 4 about a horizontal axis A-A, adjacent to the body 2 (see also FIG. 3).

The body 21 is rotatable in a seat 22 of corresponding shape provided in the body 4. In the body 21 there is formed a longitudinal passage 23, which is parallel to the axis A-A and has a cross section which is preferably greater than that of the branch 7*b* of the inlet conduit 7, with which it communicates permanently.

In the illustrated embodiment, the side of the body 21 facing the body 2 has a recess 24 in which a disc-like element 25 is mounted.

In the side of the body 2 facing the body 4 there is formed a curved slot-like aperture 26 (see also FIG. 3), which extends along a portion of a circumference concentric with the axis A-A.

The number 27 indicates a pin which extends parallel to the axis A-A, essentially without play, in the body 21 and in the disc element 25, and with circumferential play in the slot-like aperture 26 of the body 2.

The pin 27 interacts with the slot-like aperture 26 so as to allow the body 21 to make a limited angular movement about the axis A-A.

With reference to FIGS. 2 and 3, a constricted orifice 28 (see also FIG. 5) is formed in the disc element 25 in alignment with the passage 23 of the body 21, this orifice being used to control the communication between the conduit 23 and the passage 19 (FIG. 2), and ultimately the communication between the inlet passage 7 and the chamber 11.

The angular position of the member 21 can be controlled by means of a manual control member, indicated as a whole by 29 in FIGS. 1, 3 and 4, and comprising a handle or knob 29*a* and a threaded rod 29*b* (see FIG. 3 in particular) which engages with a helical toothed sector 21*a* of the movable body 21.

Figure 5:
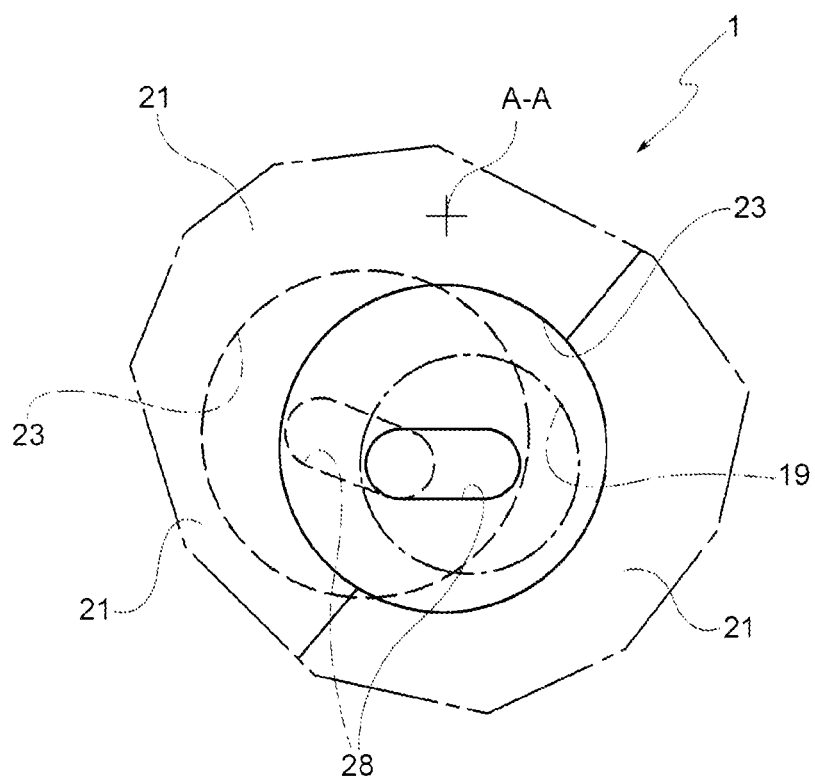
FIG. 5 is an enlarged view of a detail indicated by V in FIG. 3.

The arrangement is such that, by actuating the knob 29, it is possible to cause a rotation of the body 21 about the axis A-A in a limited angular range, thus correspondingly modifying the relative position of the orifice 28, in particular, with respect to the cross section of the passage 19, as shown more fully in FIG. 5. In this way it is possible to reduce the flow cross section of the liquid between the inlet passage 7 and the chamber 12 to a smaller value than the passage cross section of the orifice 28 which can conveniently have an elongated shape.

FIG. 5 shows, in solid lines and in broken lines respectively, two different relative positions of the orifice 28 with respect to the passage 19: in the position shown in solid lines, the whole profile of the orifice 28 is contained within the profile of the conduit 19, while in the position shown in broken lines only a part of the profile of the orifice 28 extends into the profile of the conduit 19, thus causing further throttling of the flow of the liquid towards the chamber 11 of the device.

In operation, a flow of liquid is supplied from the inlet passage 7. Part of this flow reaches the chamber 10, above the diaphragm 9, and a reduced part of this flow reaches the chamber 11.

The piston 12 is subjected on one side to the pressure of the liquid in the chamber 10, and on the other side to the pressure of the liquid in the chamber 11 and to the action of the helical spring 15, and therefore assumes an equilibrium position which depends on the extent of the throttling carried out by means of the orifice 28, according to the position to which the member 21 has been manually set.

The relative position of the extension 16 with respect to the seat 17 and to the outlet orifice 18 also varies in a corresponding way. Consequently there is a variation in the flow rate of the liquid flowing through the control device 1 and out of it through the outlet passage 18.

As mentioned above, the flow rate of the liquid out of the device 1 according to the present invention is essentially independent of the pressure of the liquid at the inlet.

The flow control device according to the invention is conveniently usable in a machine for making coffee, particularly espresso coffee. A flow control device of this type can be interposed between the pump (which supplies the flow of water towards the brewing chamber in a machine of this type) and the brewing chamber itself, and is therefore positioned upstream of the latter. In this case, the (hot) water intended to create the brew passes through the flow control device.

Alternatively, a flow control device according to the invention can be interposed between the brewing chamber of a machine of this type and the outlet for dispensing coffee towards a container such as a cup or the like. In this arrangement, the brew of coffee produced in said chamber passes through the flow control device downstream of the brewing chamber during operation.

Naturally, the principle of the invention remaining the same, the forms of embodiment and the details of construction may be varied widely with respect to those described and illustrated, which have been given purely by way of non-limiting example, without thereby departing from the scope of the invention as defined in the attached claims.

The invention claimed is:

1. A machine for preparing coffee, comprising:
   a brewing chamber;
   water supply means for supplying a flow of water to the brewing chamber; and
   an adaptive flow control device (1) for said flow of water, positioned in series with said water supply means and the brewing chamber and comprising:
      a body (2-4) having an inlet passage (7) and an outlet passage (18) for the liquid, wherein there is defined an internal cavity (8) which by means of a movable intermediate member (9, 12) is divided into a first and second chamber (10, 11) which are sealingly separated from one another, by means of a diaphragm member (9); the first chamber (10) being adapted to be put into communication with the inlet passage (7), and resilient means (15) being provided in the second chamber (11) which tend to urge said movable member (9, 12) towards the first chamber (10); said movable member (9, 12) having an associated valve member (16) interacting with an associated valve seat (17) provided in said body (2-4) so as to form a valve device (16-18) defining a first orifice with a variable passage cross section between the inlet passage (7) and the outlet passage (18); and
      an adjustable throttle device (20), substantially in series with said first orifice, between the inlet passage (7) and the outlet passage (18);
      wherein said valve device (16-18) is positioned in said second chamber (11), and the inlet passage (7) is connected also to said second chamber,
      wherein said adjustable throttle device (20) is positioned between the inlet passage (7) and said second chamber (11), upstream of said valve device (16-18), and
      wherein the first conduit (7*a*) is connected at one end to the inlet passage (7) and at the other end to the first chamber (10), and the second conduit (7*b*) is connected at one end to the inlet passage (7) and at the other end to the second chamber (11).

2. The machine according to claim 1, the adjustable throttle device (20) comprises a movable body (21) movable in a seat (22) interposed between said second conduit (7b) and said second chamber (11), a constricted passage (28) having a smaller cross section than those of said first and second conduits (7a; 7b) being defined in said movable body (21), the movable body (21) having associated control means (29) operable to adjust the configuration of said constricted passage (28) with respect to said second conduit (7b; 19) so as to correspondingly modify the minimum cross-section of said further orifice for the flow of the liquid between the inlet passage (7) and said second chamber (11).

3. The machine according to claim 2, wherein the movable body (21) is essentially cylindrical, and is mounted rotatably in said seat (22) about an axis (A-A), and said constricted passage (28) is provided in an eccentric position with respect to said axis (A-A).

4. The machine according to claim 3, wherein said control means (29) comprise a threaded rod (29b) which meshes with a pinion (21a) with helical teeth of said movable body (21), and which has a knob formation (29a) allowing the rotation thereof.

5. The machine according to claim 2, wherein means (27, 26) are provided for limiting the movement of the movable body (21) relative to said rigid body (2-4).

6. The machine of claim 1, wherein the wherein the flow control device is upstream of said brewing chamber.

7. The machine of claim 1, wherein the flow control device is downstream of said brewing chamber.

* * * * *